Patented May 20, 1941

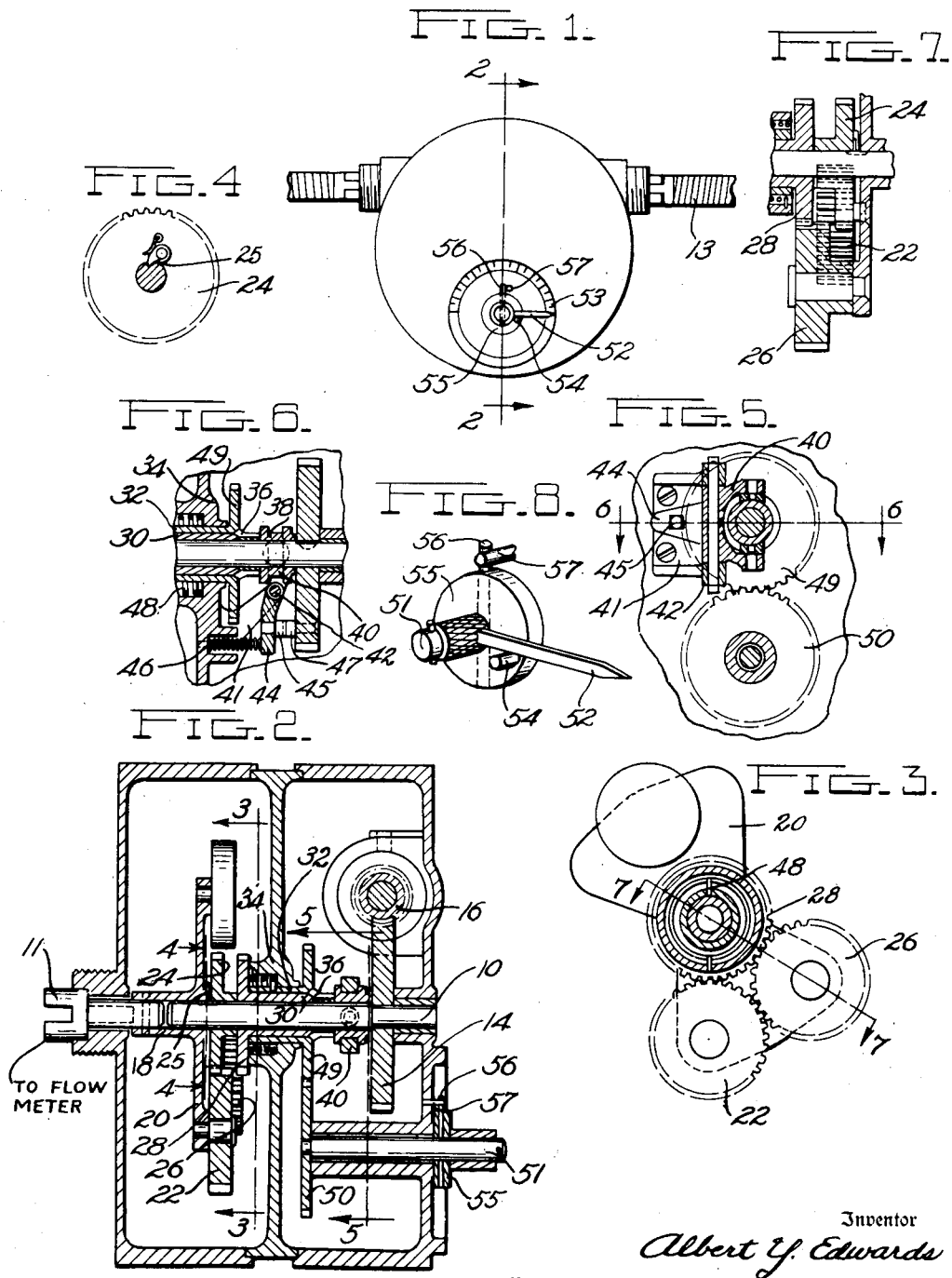

2,242,945

UNITED STATES PATENT OFFICE 2,242,945

INDICATING APPARATUS

Albert Y. Edwards, Bryan, Ohio

Application June 5, 1939, Serial No. 277,479

3 Claims. (Cl. 74—282)

This invention relates to indicating apparatus of the type used to indicate "miles per gallon" in an automotive vehicle and is particularly directed to the means used to correlate the factors entering into the indication.

It has heretofore been proposed to provide an indicator for a vehicle in which the fuel mileage may be displayed to the operator in terms of miles per gallon. Such devices have been elaborate, complicated and difficult to construct. It is the primary object of the present invention to provide a simple "miles per gallon" indicator in which the movement of a part driven by the speedometer cable and the movement of a part driven by a suitable flow meter actuated by fuel being supplied to the engine are efficiently combined to produce a single indicating movement.

Other objects and advantages of the invention will become apparent as the description proceeds, reference being had to the accompanying drawing, in which—

Figure 1 is a front elevation of an indicator constructed in accordance with the present invention;

Fig. 2 is a section on line 2—2 of Fig. 1;

Figs. 3, 4 and 5 are sections on lines 3—3, 4—4 and 5—5, respectively, in Fig. 2;

Fig. 6 is a section on line 6—6 of Fig. 5;

Fig. 7 is a section on line 7—7 of Fig. 3, and

Fig. 8 is a detail perspective view of the needle operating and restraining elements.

Referring to the drawing, the invention is particularly directed to an apparatus to correlate the movement of a shaft 10 driven from one variable source, such as a speedometer cable, and a shaft 11 driven from a second variable source, such as a flow meter actuated by the fuel of an automotive vehicle. The shaft 10 may be connected to the speedometer cable (diagrammatically illustrated at 13) by a gear 14 meshing with a worm 16 fixed to the cable.

The flow meter driven shaft 11 is pinned or otherwise fixed to a sleeve 18 carrying an arm 20 on which an outer, bodily translated, planetary gear 22 is rotatably mounted. The gear 22 is constantly in mesh with a speedometer gear 24 which is driven from the shaft 10 through an overrunning clutch connection, as shown in Fig. 4. The purpose of the overrunning clutch connection will presently become apparent.

At one side of the arm 20 and constantly meshing with outer gear 22 is a second idler planetary gear 26 which meshes with an inner indicating gear 28 carried on a sleeve 30 which is journalled over shaft 10. Gear 28 is thus driven from the speedometer driven gear 24 through the meshing bodily rotated gears 22 and 26.

An outer sleeve 32 is interposed between sleeve 30 and a portion 34 of the instrument housing. The sleeves 30 and 32 are adapted to be releasably connected by a clutch which will be presently described.

The driving connection between sleeve 30 and sleeve 32 preferably includes a sleeve clutch 36 having tapered faces which, when in engaging position, frictionally contact each of the two sleeves. The clutch is provided with a shifting collar 38 loosely mounted on shaft 10 and adapted to be reciprocated by a shifting fork 40 which is pivoted to a bracket 41 by an elongated pin 42. At one side the shifting fork terminates in a tongue 44 carrying a cam 45 and engaged by a coil spring 46 which urges the shifting fork and hence the clutch to engaging position as shown in Fig. 6. A second cooperating cam 47 is carried by the drive gear 14 so that at each revolution of the drive gear the cams engage and move the shifting fork about its pivot pin and disengage the clutch 36. The parts will be held in disengaged position for a predetermined length of time, depending upon the angular extent of cam 47 carried by the drive gear 14. The angular extent of the cam 47 can be readily determined by experimentation and depends on the rapidity with which the parts return to their normal position upon release of the clutch 36. It will be seen that while the cams are engaged and the clutch released, the driving connection between sleeve 30 and sleeve 32 is interrupted. A returning spring 48 has one end fixed in the stationary part 34 of the housing and the other end fixed in a portion of the sleeve 32 so that as sleeve 32 is rotated the spring winds up and when the sleeve is released from driving engagement by clutch 36, unwinding of the spring causes the sleeve 32 to fly back to a predetermined position.

Upon reaching the predetermined position to which it is returned by spring 48, sleeve 32 is again placed in driving engagement with the sleeve 30 by reason of the clutch 36 being returned to engaging position. The returning motion is made as rapid as possible so that the time interval between successive engagements of the clutch is very short.

A driving pinion 49 is formed on or carried by the end of sleeve 32 and meshes with a gear 50. The gear 50 is keyed to a needle driving shaft 51 which extends through the front of the instrument. An indicating needle 52 is preferably loosely mounted on the shaft 51 and cooperates with a scale 53 to indicate the attained position of the shaft, a needle driving pin 54 is carried by a collar 55 which is pinned to the shaft 51 so that as the shaft rotates the needle will be carried as far as the shaft is turned. When the shaft returns the needle will remain in its attained position since the positive actuating force applied by pin 54 is in one direction only. The pin 56 is used to pin the collar to the shaft 51 and extends outwardly beyond the collar to cooperate with a stop 57 in its path of rotation. The stop 57 is preferably set in front of the casing although it may be placed anywhere in the train of the reciprocating movement of the shaft 51 and its driving gears 49 and 50. The stop 57 limits the returning movement of the reciprocating parts, including sleeve 32, gears 49 and 50, shaft 51 and drive collar 55. The needle 52 is thus carried as far as the drive shaft can turn it. When a reading of the instrument is desired, it is necessary for the operator to reset the needle to its lower limit position and permit it to be carried forward again by pin 54.

In order that the device may be kept as simple as possible, the present invention is designed to give an indication only within a limited range having its upper limit equaling twice its lower limit as, for example, 10 miles per gallon to 20 miles per gallon, or 15 miles per gallon to 30 miles per gallon. To cover a wider range the mechanism becomes greatly complicated. The selected lower limit is indicated when gear 28 is stationary, as hereinafter set forth, and the upper limit is, therefore, represented by one half turn of the speedometer driven shaft 10 resulting in a half revolution of the gear 28 before cam 47 trips the clutch 36 and allows the sleeve 32 to return. In operation, therefore, gear 24 being driven from the speedometer cable or similar source through shaft 10 and arm 20 being driven from the flow meter or other second variable source through shaft 11 cooperate to produce a driving motion in the indicating gear 28. Gear 24 driven by the speedometer shaft drives the outer planetary gear 22 and would transmit its motion through idler 26 to gear 28 but the transmission of such motion is varied by reason of the displacement of gears 22 and 26 as a result of rotation of the arm 20 on which they are mounted. For example, assuming all of the gears to have the same number of teeth, if shaft 10 is rotating at 2-N revolutions per minute at the same time that shaft 11 is rotating at N revolutions per minute, gear 28 will remain stationary for the reason that gear 24 will drive gear 22 and hence gear 26 at such speed that the latter will merely roll around on and will not rotate gear 28. However, if the rotation of shaft 10 increases to something above 2-N revolutions per minute, the increased rotation will result in gear 28 being rotated out of its normal position and will hence result in driving sleeve 32 in a direction opposite to the direction of movement of shaft 10. Sleeve 32 will be driven only so far as it may be carried in the interval between successive rotations of cam 47, since its connection with the end of the driving sleeve 39 is broken at each rotation of the cam by release of the clutch 36. Thus sleeve 32 will make only a partial rotation and will return to its normal position as soon as cam 47 trips clutch 38, the returning force being supplied by spring 43. Assuming a constant rotation of the flow meter shaft 11, it will be seen that if the rate of travel increases, shaft 10 will be rotated more rapidly and hence sleeve 32 will also be rotated more rapidly and will attain a greater rotation before it is tripped by cam 47 and caused to be returned. Proper calibration of the scale 53 will give the operator the attained position of sleeve 32 in terms of miles per gallon.

In order to prevent a backward rotation of gear 28 and hence an undesired unwinding of the spring 43, the one-way clutch connection is provided for gear 24. Thus the stop 57 will result in a tension being placed on the entire system and gear 24 must be free to move backwards relative to its associated driving shaft 10.

While the invention has been described in connection with a particular application, it will be appreciated that numerous applications thereof may be made where it is desired to correlate two variable driving motions. Such applications may be made without departing from the invention as defined in the appended claims.

What I claim as new and desire to secure by United States Letters Patent, is:

1. In a device of the class described, a first drive shaft, a second drive shaft, an indicating shaft and a differential mechanism interposed between said drive shafts and said indicating shaft including a gear driven by said first drive shaft and planetary gears driven by said second drive shaft, one of said planetary gears being meshed with said first gear, a second planetary gear driven by said first planetary gear and meshing with a gear which is adapted to drive said indicating shaft, and means to interrupt the drive between said differential mechanism and said indicating shaft.

2. In a device of the class described, a first drive shaft, a second drive shaft, an indicating shaft and a differential mechanism interposed between said drive shafts and said indicating shaft including a gear driven by said first drive shaft and planetary gears driven by said second drive shaft, one of said planetary gears being meshed with said first gear, a second planetary gear driven by said first planetary gear and meshing with a gear which is adapted to drive said indicating shaft, and means to interrupt the drive between said differential mechanism and said indicating shaft at each revolution of said first drive shaft.

3. In a device of the class described, a first drive shaft, a second drive shaft, an indicating shaft and a differential mechanism interposed between said drive shafts and said indicating shaft including a gear driven by said first drive shaft and planetary gears driven by said second drive shaft, one of said planetary gears being meshed with said first gear, a second planetary gear driven by said first planetary gear and meshing with a gear which is adapted to drive said indicating shaft, and means operable in a single revolution and driven by said last named gear to indicate the relative velocities of said first and second drive shafts.

ALBERT Y. EDWARDS.